Dec. 28, 1943.  G. W. BLAIR ET AL  2,338,022
APPARATUS FOR MAKING AUTOMOBILE FLOOR COVERINGS AND THE LIKE
Filed April 26, 1940  4 Sheets-Sheet 1
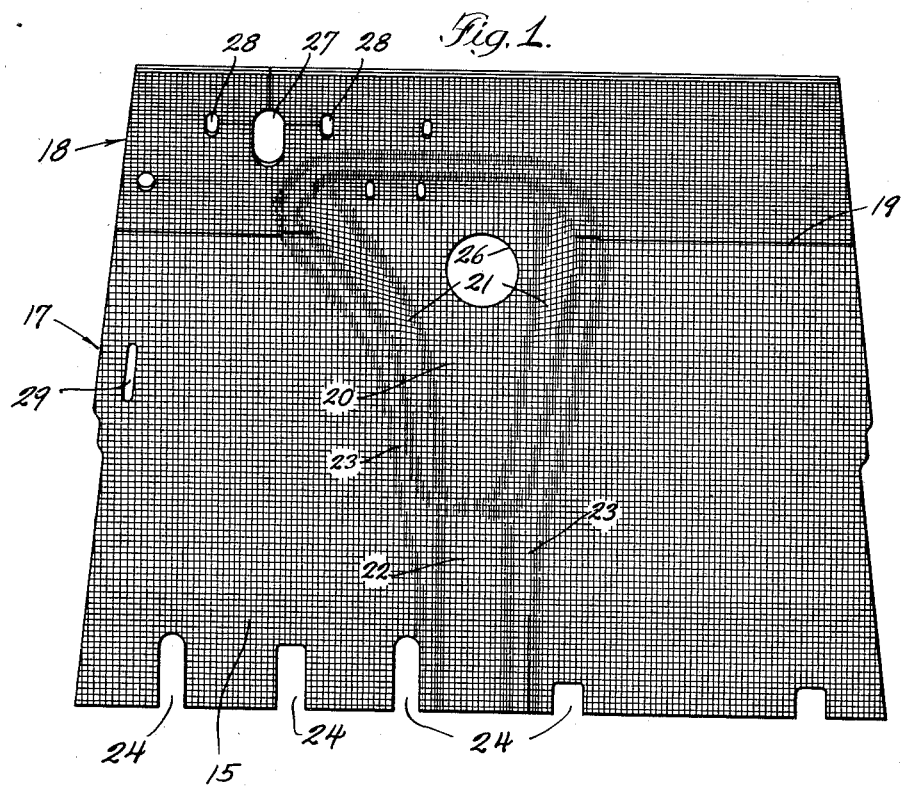
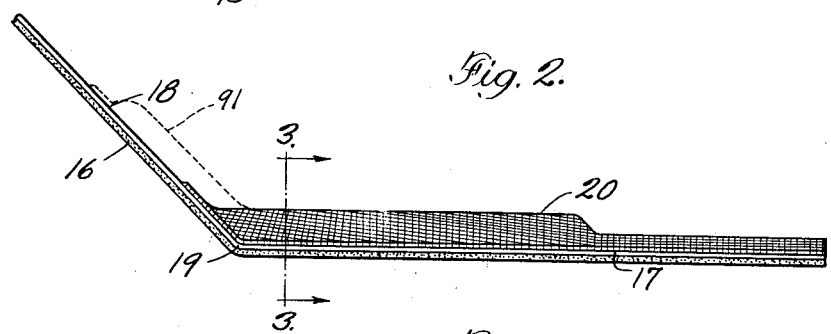
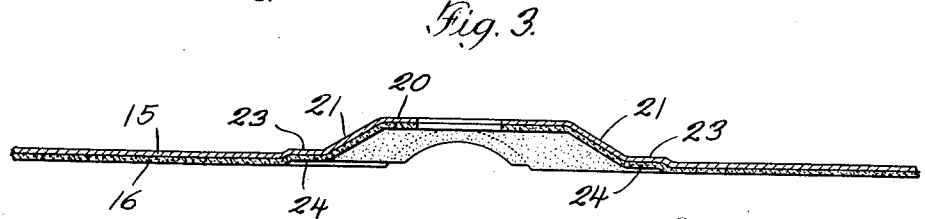
Inventors:
George W. Blair.
John F. Schott.
By Eugene M. Giles
Atty.

Dec. 28, 1943.   G. W. BLAIR ET AL   2,338,022
APPARATUS FOR MAKING AUTOMOBILE FLOOR COVERINGS AND THE LIKE
Filed April 26, 1940   4 Sheets-Sheet 2
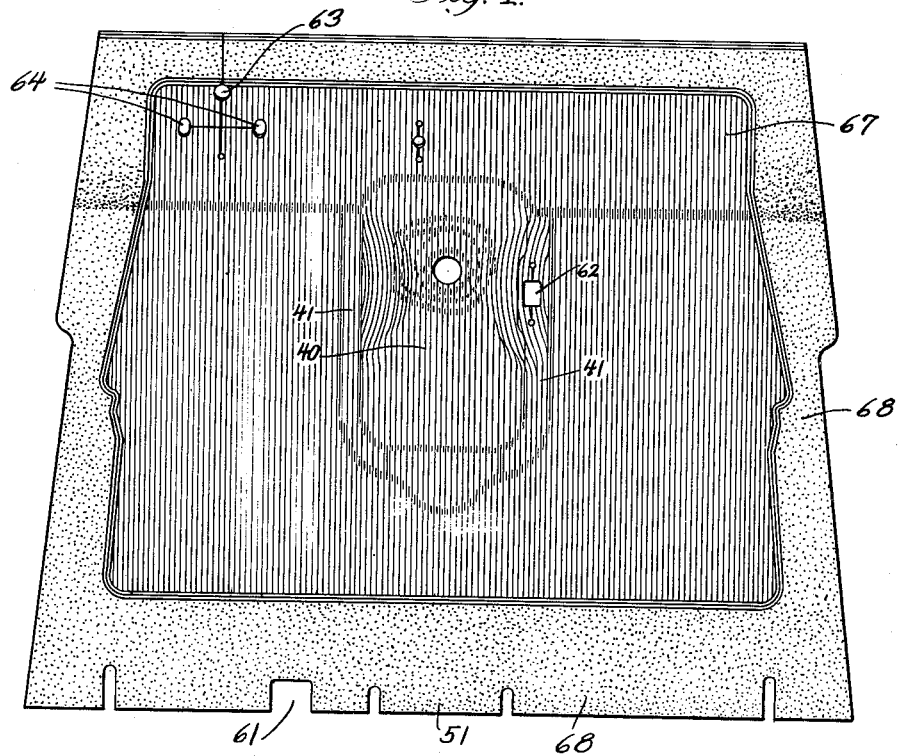
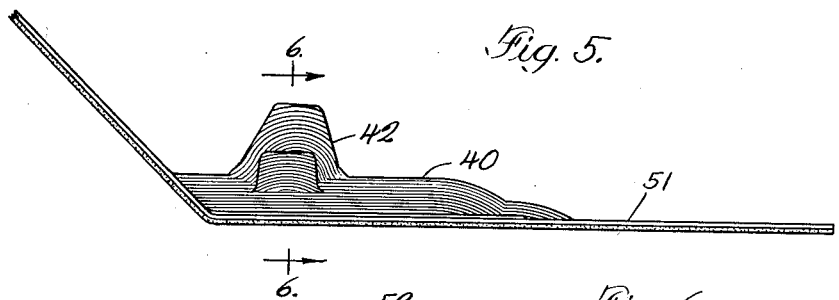
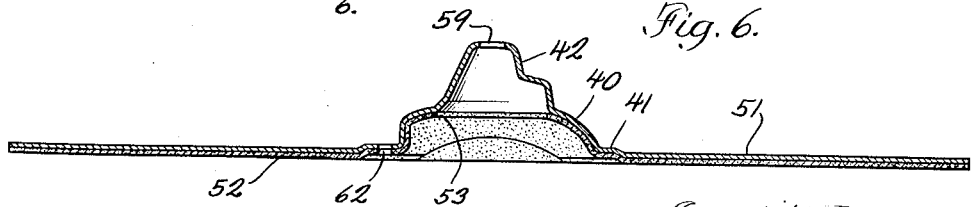
Inventors:
George W. Blair.
John F. Schott.
By Eugene M. Giles
Atty.

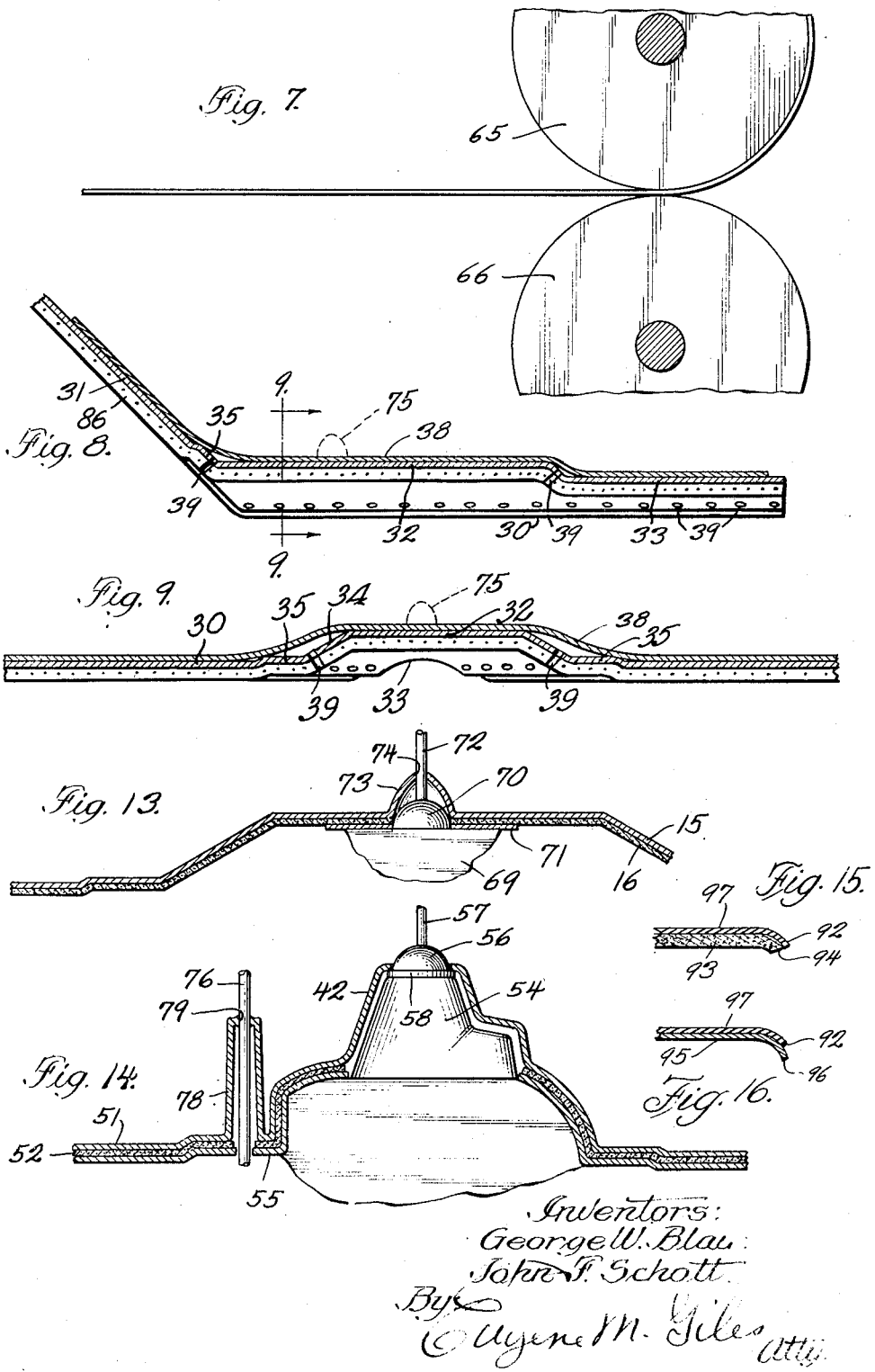

Dec. 28, 1943.   G. W. BLAIR ET AL   2,338,022
APPARATUS FOR MAKING AUTOMOBILE FLOOR COVERINGS AND THE LIKE
Filed April 26, 1940   4 Sheets-Sheet 4
Fig. 10.
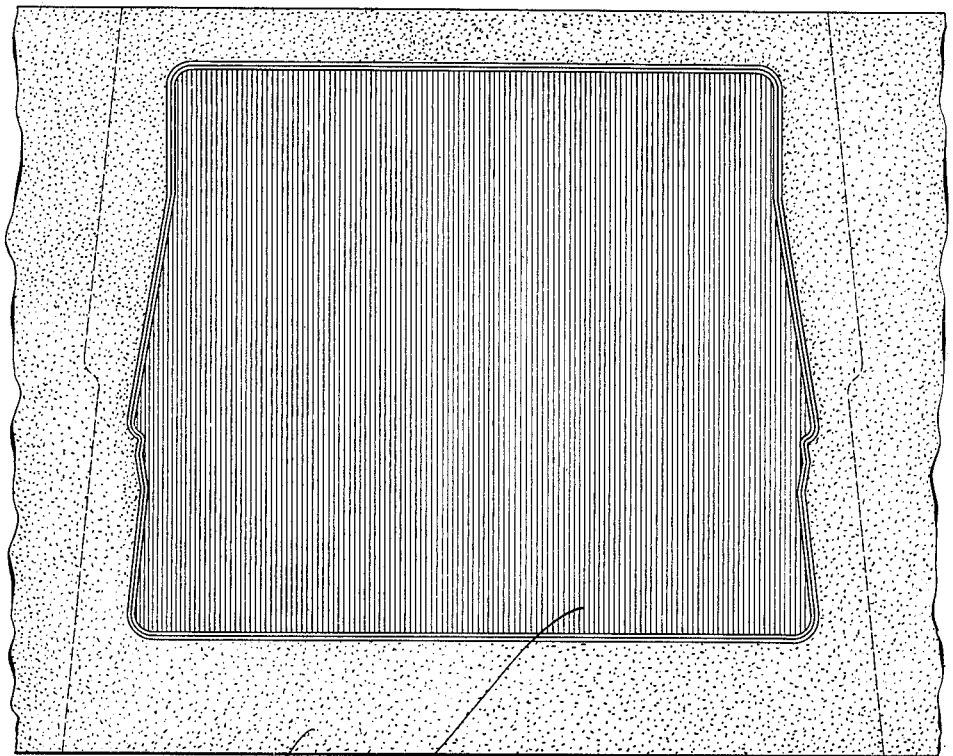
Fig. 11.
Fig. 12.
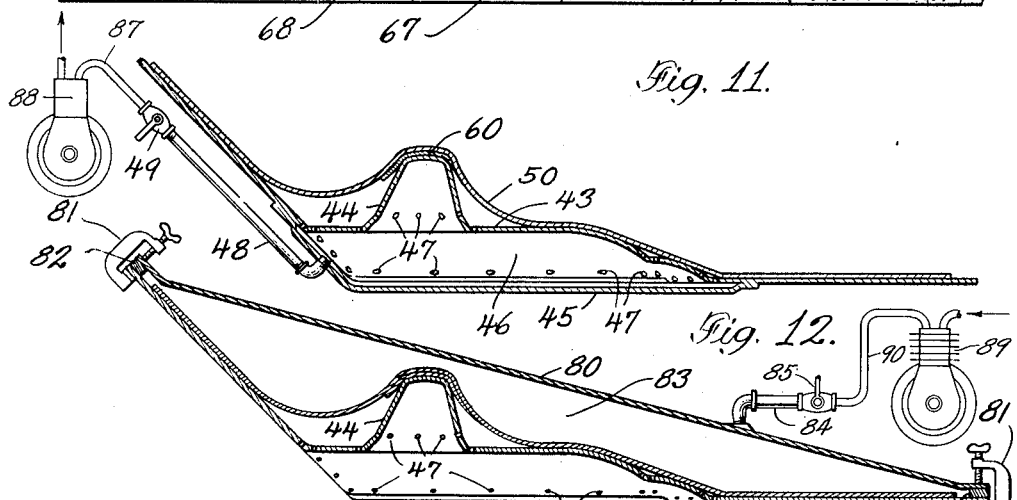
Inventors:
George W. Blair,
John F. Schott.
By Eugene M. Giles atty.

Patented Dec. 28, 1943

2,338,022

UNITED STATES PATENT OFFICE 2,338,022

APPARATUS FOR MAKING AUTOMOBILE FLOOR COVERINGS AND THE LIKE

George W. Blair and John F. Schott, Mishawaka, Ind., assignors to Mishawaka Rubber and Woolen Manufacturing Company, Mishawaka, Ind., a corporation of Indiana Application April 26, 1940, Serial No. 331,885

5 Claims. (Cl. 18—35)

Our invention relates to apparatus for making contoured floor coverings and the like, such as floor mats for automobiles with suitable portions thereof pre-formed and shaped so that when the floor covering or mat is placed in position on the floor these pre-formed portions correspond to and fit parts that are offset from or project above the surface of the floor, and this application is a continuation in part of our Patent No. 2,032,832, granted March 3, 1936, and is a continuation of our application Serial No. 39,724, which was filed on September 9, 1935.

In automobiles it is a common practice to construct the floor of the driver's compartment with raised portions to accommodate thereunder the transmisison case or housing, or with the projecting top of such case or housing itself serving as an elevated or raised part of the compartment floor, and it is desirable that the mat or floor covering should be shaped or fashioned to conform to and cover such raised portions or parts and preferably also to encase any protuberances thereabove. Moreover, it is also desirable to extend portions of the mat or floor covering up around certain levers and operating parts in a manner to insure freedom of operation of these levers or parts and at the same time close the openings through the floor against entrance of drafts, improve the appearance of the car interior, and protect the shoes of the car occupants against soiling and scuffing by contact with such levers or operating parts. The floor of the driver's compartment is also commonly made with a sloping or inclined toe board portion and it is preferable to form the mat with the corresponding portion thereof similarly sloped or inclined so as to insure a definite bend at the proper location to correspond to and fit the corner that is present at the juncture of the main floor and the board portions.

The principal objects of our invention are to provide facilities whereby floor coverings or mats may be readily contoured or fashioned in conformity with floors such as those above mentioned, as well as any other floors having offsets, protuberances or other formations constituting elevations and depressions in accordance with which it is desired that the floor covering or mat should be contoured or fashioned; to provide mat contouring means whereby the floor covering material is distended and shaped without any injury to a pattern that may have been previously impressed on the face of the floor covering material; to utilize fluid pressure for conforming the material to the irregularities of the contouring surface; to provide facilities for holding the material down in recesses or depressions of the contouring surface; to provide facilities for forming the edge of the mat so it will fit snugly against the floor; and in general to provide simple, convenient and effective means which permits rapid and economical production of contoured mats or floor coverings, these and other objects being accomplished with the present invention as disclosed hereinafter, reference being had to the accompanying drawings in which—

Fig. 1 is a top or plan view of an automobile mat or floor covering constructed in accordance with our invention;

Fig. 2 is an edge view thereof as it appears from a position at the left of Fig. 1;

Fig. 3 is a transverse sectional view on the line 3—3 of Fig. 2;

Fig. 4 is a view similar to Fig. 1, but showing an automobile mat or floor covering of another form;

Fig. 5 is an edge view of the mat of Fig. 4 as it appears from a position at the left of said Fig. 4;

Fig. 6 is a transverse sectional view on the line 6—6 of Fig. 5;

Fig. 7 shows the manner of preparing the rubber stock for the mats;

Fig. 8 is a central longitudinal sectional view of a form that may be employed for making the mat shown in Fig. 1, a sheet of rubber being shown in the forming position thereon;

Fig. 9 is a transverse sectional view on the line 9—9 of Fig. 8;

Fig. 10 is a top view of the rubber blank that is used in making the mat of Fig. 4;

Fig. 11 is a central longitudinal sectional view of a form that may be employed in making the mat of Fig. 4, a sheet of rubber being shown in the forming position thereon;

Fig. 12 is a view similar to Fig. 11, but showing a modified arrangement for shaping the rubber sheet;

Fig. 13 is an enlargement of a fragmentary central portion of Fig. 3 showing a modification of the mat of Fig. 1 with portions of the car structure shown in connection therewith;

Fig. 14 is an enlargement of a fragmentary central portion of Fig. 6 showing a modification of the mat of Fig. 4 with portions of the car structure also shown in connection therewith;

Fig. 15 is a fragmentary sectional view of the edge of the mat showing an edge formation that we have found desirable and effective to hold the mat edge snugly against the floor and prevent scuffing; and Fig. 16 is a fragmentary sectional view of the edge of the form as constructed to produce the mat edge formation of Fig. 15 and shows a fragmentary edge portion of the rubber layer in the forming position thereon.

The mats or floor coverings made in accordance with this invention are of soft rubber or other suitable material, preferably with a base of felt or similar material attached to the underside of the rubber, although the base material may be omitted and the rubber used alone if desired. The rubber is prepared by calendering in sheet form with any desired pattern impressed on the surface thereof and the uncured rubber sheet is laid on a form, the top surface of which corresponds to the particular form of the floor, toe board, transmission top and other parts that are to be covered by the finished mat, and by applying the rubber sheet while hot from the calender or by a preliminary heating before placing in the vulcanizer or by the heating in the initial stages of vulcanization, the rubber has or is given sufficient softness so that it sinks down around elevated portions of the form and into recesses thereof so that it assumes the shape of the top surface of the form, after which the rubber is cured on the form and permanently set in the shape that it has assumed thereon.

In some cases wherein there are abrupt or relatively high elevations over which the rubber sheet is to be formed, facilities are provided to insure a positive shaping of the rubber to accord with the configuration of the top surface of the form, air pressure being preferably employed for this purpose either by evacuating the air sufficiently at suitable places between the form and overlying uncured rubber sheet, or by increased air pressure against the outer side of the sheet so that said rubber sheet, when softened by heat, will be pressed down into close fitting contact with all parts of the top surface of the form, thus insuring an accurate reproduction, in the under side of the rubber, of the top surface of the form without materially disturbing or disfiguring the pattern that may have been impressed in the surface of the rubber sheet in calendering.

If the rubber sheet is to be provided with a backing on the underside, allowance should, of course, be made in the dimensions of the elevational features of the form so that when the backing material is applied on the under side of the rubber sheet and in any of the depressions thereof that are to be lined, the lined mat will properly fit the floor. Any suitable material may be used for such backing, a loose texture felt punched on burlap and stripped therefrom having been found particularly adaptable for the purpose as it requires no preforming. The surface of the felt is merely treated with a suitable cement or adhesive and pressed on the under surface of the pre-formed rubber sheet and because of its loose texture the felt readily assumes a shape corresponding to that of the rubber to which it is applied.

Referring now to the drawings, and particularly Figs. 1, 2 and 3, which show an automobile mat or floor covering for a make of car having a moderately elevated portion in the floor of the driver's compartment, and Figs. 8 and 9, which show a form suitable for making the mat of Figs. 1, 2 and 3, the reference numeral 15 indicates the rubber layer of the mat and 16 the felt backing, said mat having a main floor portion 17 terminating at the front in a toe board portion 18 which is bent upwardly along the transverse line 19 at an angle to the main floor portion 17. Between the lateral edges of the mat is a raised portion or bulge 20 of a shape corresponding to an inverted pan like member or hump with which the floor of the car is provided to accommodate thereunder the transmission case or housing, which said raised portion or bulge 20 extends onto the inclined toe board portion 18 of the mat and forms in the under side of the mat a recess which is open at the front end. This raised portion 20, which has a flat top with inclined sides 21, narrows toward the rear, as shown particularly in Fig. 1 and terminates in a somewhat lower transversely arched portion 22 which extends to the rear end of the mat. The inverted pan like member of the car floor which is covered by the raised portions 20 and 22 of the mat has an attaching flange along the edge which rests on the top of and is secured to the floor proper of the car and the mat is formed along the forward end and sides of the raised portion 20—21 and along the sides of the transversely arched portion 22, with a ledge portion 23 which is raised sufficiently to provide thereunder a shallow recess 24 to accommodate said flange.

This mat 17—18, which is of suitable marginal outline with the usual notches 25 in the rear edge where required to fit in the compartment of the car, has an opening 26 in the top of the raised portion 20—21 for a boss of the transmission housing where the gear shift lever is connected; and said mat also has the usual steering port opening 27, brake and clutch pedal openings 28, brake lever opening 29 and such other openings as are required for parts that must extend therethrough, and when placed in position on the car floor fits neatly and satisfactorily thereon at all places.

In making this mat of Figs. 1, 2 and 3, a form such as shown in Figs. 8 and 9 is employed, which may be of sheet metal or other suitable material, and has a flat portion 30 corresponding to the floor proper of the car and the inclined portion 31 is shaped with raised portions 32 and 33 corresponding in shape and size to the raised portions of the car floor, said portion 32 having inclined sides 34 and there being a slightly raised ledge 35 along the sides of the raised portions 33 and 34 and across the front of the latter.

A sheet of uncured soft rubber composition is provided which is calendered to the proper thickness and provided on one side, if desired, with a surface design, said sheet being substantially of the same area as the combined area of the portions 30 and 31 of the form, and this sheet is laid on the form 30—31 as shown at 38 in Figs. 8 and 9 with the pattern side of the sheet uppermost. Preferably the blank 38 for the mat is cut from the rubber as it comes from the calender and is placed on the form while still hot from the calendering operation in which condition it is sufficiently soft so that it yields at all unsupported points and sinks down into close contact with the form at all places, thereby assuming the shape of the top surface of the form 30—31. If the rubber is not used while sufficiently hot and soft from the calendering operation, it may be heated before or after it is placed on the form so as to assume the shape thereof. For this purpose the form 30—31 may be provided with an electrical heating element 86 on the under side and this heating element may be used not only for softening and shaping the rubber blank, but also for vulcanizing same. The form is preferably provided at all places where air is likely to pocket between the rubber and the form, with facilities such as the holes 39 to permit free escape of pocketed air which might otherwise delay or interfere with the settling and proper shaping of the rubber, the holes 39 preferably being located adjacent the angles formed by the juncture of the sloping sides of the raised portions and the flat portions of the form, at which angles air is likely to be entrapped. These holes, of course, extend through the electrical heating element 86 if such element is employed. After this shaping has occurred, the sheet 38 while remaining on the form, is vulcanized in any convenient manner and thus permanently shaped in the form of the top surface of its form 30—31.

Thus the mat not only is fashioned with the parts 17 and 18 in an angular relation corresponding to the main and toe board portions of the car floor for which it is designed, but it is also fashioned with an elevated area or bulge 20 corresponding in location and shape to the hump of the car floor, said bulge being marginally contoured at each side or shaped along the base in the angular form, as shown in Fig. 2, with the vertex of the angle at the point 19 and the mat being formed with a bend or crease 19 extending laterally from each side of the bulge 20 at the vertex of said angle so that the parts 17 and 18, by reason of the angular contour of the sides of the bulge 20 and the crease at 19, meet at each side of the bulge in a trough-like form extending laterally from the base of the bulge. By making the mat in this manner there is no wrinkling or buckling of the mat such as would occur at the bend if the mat were made flat and the part 18 thereof thereafter turned up to the angular position. In some cases the bulge 20 is extended well up the inclined portion 18 as indicated by dotted lines at 91 in Fig. 2, and if such mats were made flat and the part 18 thereafter turned up, the buckling and wrinkling at the bend would be even more pronounced.

After vulcanizing, the soft rubber sheet 38, which is then inherently shaped as shown in Fig. 1 to correspond to the form on which it was vulcanized, may be trimmed to the proper size and marginal outline and provided with the necessary holes and used alone as a mat. It is preferred, however, to provide a backing on the under side of the rubber sheet, which said backing is preferably a loose texture felt prepared by punching on burlap and stripping therefrom. A piece of such felt of dimensions corresponding to the shaped rubber sheet is sprayed on one side with a suitable cement or adhesive and pressed onto the under side of said shaped sheet, and said felt, by reason of its loose texture readily conforms to the shape of the raised portions 20 and 22 of the rubber sheet without the necessity of any preliminary shaping thereof.

After the felt backing has been attached to the shaped rubber sheet, the combined structure is trimmed to the proper size and shape and has the notches 24, openings 26, 27, 28, 29 and such other openings as may be required cut therethrough to provide a mat which in the finished form corresponds to that shown in Figs. 1, 2 and 3.

In some automobiles the raised portions over and onto which it is desired to fit the mat may be so abrupt and high that the rubber will not readily assume the desired shape by the mere heating thereof, an example of such mat being shown in Figs. 4, 5 and 6 wherein there is a raised portion 40 with ledge 41 along each side which fits over a correspondingly shaped pan-like member which forms part of or extends up through the car floor to accommodate the top of the transmission or transmission case, said pan member of the floor being quite abrupt at some places and necessitating a corresponding abrupt shaping of the rubber with sharp bends that would not readily be formed by mere heating of the rubber on a corresponding form. Moreover, in the particular make of car for which the mat of Figs. 4, 5 and 6 is designed, there is a protuberance from the transmission case which projects up above the floor hump and carries the gear shift lever and as it is desirable to extend the rubber of the mat up around this protuberance to the top thereof as indicated at 42, special facilities are desirable to insure the extreme shaping of the rubber that is required in such cases.

The form that is employed for making this mat is shown in Fig. 11 and is similar to that of Figs. 8 and 9 except that it has a raised portion 43 of different form and a vertical extension 44 on the top thereof to form the covering for the gear case protuberance above mentioned. In this form, however, a plate 45 is secured to the bottom of the form around the base of the raised portion 43 to provide a chamber 46 which is sealed except for the small openings 47 which are located around the base of the raised portion 43 and around the base of the extension 44. A pipe 48 which leads from the chamber 46 is provided with a valve 49 and is adapted to be temporarily connected by a tube 87 with an air exhausting device 88, the tube 87 preferably being flexible and arranged for quick connection with and disconnection from the valve 49, as for example, by merely holding in operative engagement therewith while the air is being exhausted.

The sheet of rubber for making the mat is prepared as in the making of the previous mat and placed on the top surface of the form as indicated at 50 in Fig. 11 and if not still hot from the calendering, is subjected to suitable heat to soften the rubber so that it may be readily shaped in the required form. Either during or after the heating of the rubber 50, air is gradually exhausted from the chamber 46 through the pipe 48 and as this chamber communicates through the openings 47 with the low places and corners where air will pocket between the rubber and the form, the air will be exhausted from these pockets and by reason of the atmospheric pressure at the outer side then being greater than that in the form, the rubber is forced down into close fitting contact with the form at these low places and corners, and locally held in the recesses or cavities thereof until set in the shape of the top surface of the form. When the air has been sufficiently exhausted to accomplish the required shaping of the heated rubber, the valve 49 is closed to maintain in the chamber 46 a low pressure condition which will insure the holding of the rubber sheet during vulcanization in the shape that it has assumed on the form, and after the tube 86 has been disconnected from the valve 49, the form with the rubber sheet thereon is then placed in the vulcanizer and cured, and the rubber sheet thus permanently set in the form of the top surface of the form.

Instead of evacuating the air from the under side of the rubber sheet as explained above and shown in Fig. 11, the form may be the same as that shown in Fig. 11 but with the plate 45 omitted as shown in Fig. 12 and a cover plate 80 provided which is detachably secured to the form around the edges thereof in any convenient manner, as for example, by clamps 81 with a sealing strip 82 between the edge of the form and the cover plate 80 so as to provide a pressure chamber 83 with an air supply pipe 84 leading thereto and controlled by the valve 85, said valve being connected to an air supplying device 89 by a flexibl tube 90 which is likewise detachably connected with the valve 85 to be quickly applied and removed. After the rubber sheet has been placed on the top of the form, the cover plate 80 is secured in place and while the rubber is in a heated condition, either from the calendering operation or otherwise, air is introduced through the pipe 84 into the chamber 83 and when there is sufficient pressure in the chamber 83 to force and hold the rubber down into close fitting contact with the form, the valve 85 is closed so as to maintain this pressure therein, the air supply tube 90 is disconnected and the sheet vulcanized. Steam may be employed instead of air and in such case the steam heat may be utilized to effect vulcanization.

This pre-formed rubber sheet, which is indicated at 51 in Figs. 4, 5 and 6, may be used alone as the floor covering for the car, but preferably has a felt base or backing 52 cemented onto the under side in the same manner as in the previously described mat. This felt layer 52 preferably has a large hole 53 therein corresponding to the bottom of the raised portion 42 as shown in Fig. 6 so that the portion 42 is unlined, and in the particular car for which this mat is designed the portion 42 is preferably made slightly larger than the transmission protuberance that it is designed to encase so as to afford clearance therebetween and avoid contact of the rubber with oil or grease that may be present on the outer surface of said protuberance. In this particular make of car said transmission protuberance, which is indicated at 54 in Fig. 14, projects up through the floor pan 55 which as hereinbefore suggested, is employed to accommodate the top portion of the transmission case, and said protuberance has a cap 56 at the top through which the gear shift lever 57 extends. This cap 56 has a small annular flange 58 around the base and the raised portion 42 of the mat is provided at the top with an opening 59 of suitable size to fit down around the cap 56 above the flange 58 as shown in Fig. 13. For the purpose of reinforcing the rubber around the opening 59 a disk 60 of uncured rubber is preferably applied to the under side of the rubber sheet 50 before it is placed on the form, said disk being located on the sheet so that it will rest on the top of the form projection 44 when said sheet is located in the proper position on the form and when the opening 59 is cut in the vulcanized sheet 51 the rubber around this opening is accordingly thicker than that of other portions of the rubber sheet.

The hole 59 is preferably formed after the mat parts 51 and 52 have been assembled, at which time the mat is trimmed to the required shape and provided with edge notches 61 where required, and also with the brake lever opening 62, steering column opening 63, brake and clutch pedal openings 64 and such other openings as may be required for parts that extend through the mat.

In making mats as described above, a pattern surface may readily be employed as there is no substantial distortion of the rubber or disfiguration thereof in forming that would impair the finished surface. This surface finish or pattern may be impressed on the face of the rubber in calendering by passing the rubber between rolls 65 and 66 as shown in Fig. 7, one of which rolls, for example, the roll 66, has marked on the surface thereof the design or pattern that is to be impressed on the rubber. This pattern may be the same throughout the entire surface of the mat as shown in Fig. 1 or the mat may have a body of one design as indicated at 67 in Fig. 4 with a border portion 68 of another design. To produce a sheet of rubber with this bordered pattern or design, the impression roll 66 of the calender is made of a suitable diameter so that one revolution thereof will produce a length of rubber sheet sufficient for a mat and this cylinder has the design of a complete mat formed on the surface thereof. The strip of rubber issuing from the rolls 65 and 66 is thus formed with successive portions each bearing a complete design for a mat and by cutting the sheet at the proper place between the body designs 67, pieces such as shown in Fig. 10 are provided from which the mat of Fig. 4 may be made with the bordered design.

In forming or contouring the mat in the above described manner, after the pattern has been impressed on the sheet, the portion of the pattern at the bulge location is merely distended in forming the bulge and the pattern is accordingly quite faithfully preserved without any objectionable distortion or disfiguration. Moreover, by shaping the patterned sheet in this manner any embossing that is applicable to a flat sheet may be readily employed without the difficulties that are oftentimes experienced in impressing designs on curved or uneven surfaces, and in the contouring of the sheet the embossings merely adapt themselves to the immediate contour of the bulge.

In some cases it may be desired to provide the mat wtih flexible rubber portions which extend up around the gear shift lever, brake lever or other parts to seal the floor openings of said parts and prevent entrance of air and also to improve the appearance of the car interior and prevent soiling or scuffing of the shoes of the car occupants by contact with such parts, such an extension for the gear shift lever being shown in Fig. 13. In said figure a fragmentary portion of the transmission housing is indicated at 69 with a boss 70 which extends through the elevated top of the floor pan 71, and 72 is a portion of the gear shift lever which is swiveled in the boss 70, this being substantially the arrangement of the parts in the make of car with which the mat of Fig. 1 is designed to be used and the mat being the same as shown in Figs. 1, 2 and 3 with the top layer 15 of rubber and the backing 16 of felt, except that around the hole 26 in the rubber layer 15 of the mat of Fig. 1 there is, in this modified form of Fig. 13, an inverted somewhat cup like extension 73 which is integral with the rubber layer 15 and provided with a hole 74 in the top through which the lever 72 extends in snug fitting relation, said extension 73 being sufficiently flexible to permit free operation of the lever 72 without restraint and said extension 73 preferably having ample clearance around and over the boss 70 to prevent contact of the rubber with any oil or grease on the boss and to encase the lower portion of lever 72 to the desired height.

For forming the rubber layer 15 with this extension 73 for the gear shift lever, the form of Figs. 8 and 9 on which the rubber sheet is shaped, is provided on the top of the raised portion 32 with a protuberance such as shown by dotted lines at 75 of a shape corresponding to the interior of the desired rubber extension, and to insure shaping of the rubber over and around this higher elevation of the form it is preferable that an air chamber be provided under the elevations of the form, as in the form of Fig. 11, with openings leading from this air chamber to the top surface of the form at places where it may be desired to exert suction on the rubber to insure the shaping thereof snugly against the surface of the form at all points, or the air pressure arrangement of Fig. 12 may of course, be employed.

As a further example of extensions with which the rubber layer of the mat may be provided to encase parts that project up through the car floor, Fig. 14 shows a modification of the mat of Figs. 4, 5 and 6 with an extension to encase the lower end of the brake lever which, in the particular case for which said mat is designed, extends up through the opening 62 of the mat of Fig. 4. The brake lever which is indicated at 76 in Fig. 14, extends up through the car floor, a fragmentary portion of which is indicated at 55 in said figure, and the rubber layer 51 of the mat is provided, at the place where the brake lever extends therethrough, with a flexible, somewhat tubular extension 78 with a hole 79 at the upper end through which the brake lever extends in snug fitting relation, said extension 78 being preferably formed on the rubber layer in the same manner as the other elevations by providing on the form on which the rubber sheet is shaped, a suitable projection over and around which the rubber in its heated and softened form is drawn as the sheet is shaped in the desired floor covering form. Such extensions might, of course, be formed separately of uncured rubber and adhesively affixed to the rubber sheet before the latter is vulcanized so as to become an integral part thereof in the curing operation and it is to be understood that while particular shapes of mats and certain flexible extensions are shown and described herein, these are intended to be illustrative only and it is contemplated that the mats may be made in shapes and with flexible extensions other than those specifically illustrated and described herein.

In automobile mats it is desirable that the edges of the rubber layer, particularly at the door openings, fit snugly against the floor not only to conceal the edges of the felt pad and improve the appearance of the mat, but also to prevent scuffing. For this purpose we form the edge of the mat as shown in Fig. 15 with the edge portion 92 of the rubber layer curved downwardly quite abruptly and the loosely felted base 93 when applied thereunder assumes substantially the same curved form. When the edges are trimmed substantially as shown at 94 in Fig. 15, the down curved edge formation will cause the mat edge to lie snugly against the floor. This curved edge arrangement may be employed entirely around the mat and around lever openings and the like, if desired, or it may be employed only at the door openings or such places where necessary for appearance and to prevent scuffing.

For forming this curved edge, the margin of the form 95 on which the rubber layer is shaped is bent downwardly as at 96 in the form of the desired curve at the places where the curved edge is desired and when the heated rubber 97 is placed on the form, the edge portion thereof will sink down onto and take the curved form of the curved edge 96 of the form and when vulcanized, the curved edge 92 will be permanently retained by the rubber sheet.

While we have shown and described our invention in a preferred form, we are aware that various changes and modifications may be made therein without departing from the principles of our invention, the scope of which is to be determined by the appended claims.

We claim as our invention:

1. A device for making contoured floor coverings for humped automobile floors or the like, said device comprising a form having a top surface corresponding substantially to the floor area, said top surface being flat throughout the greater portion of its area and having a selected portion of its area of a hump form that is substantially a positive reproduction of a hump of the floor, said hump portion having sides sloping toward and angularly disposed with respect to said flat portion, said form having perforations adjacent the angle formed by said sloping sides of the hump portion and said flat portion, for the purpose described.

2. A device for making contoured floor coverings for automobile floors or the like, with level and sloping portions bridged by a hump, said device comprising a form having a top surface corresponding substantially to the floor area and having level and sloping portions and a bridging hump all arranged to constitute substantially a positive reproduction of the top surface of the floor, said hump portion having sides sloping toward and angularly disposed with respect to said flat portion, said form having perforations adjacent the angle formed by said sloping sides of the hump portion and said flat portion, for the purpose described.

3. Apparatus for making an integral preshaped rubber mat for humped automobile or like floors, such mat having a major portion designed to lie in a single plane and a relatively minor portion contoured to fit the hump in such floor, such apparatus comprising a rigid member having a flat face with a hump portion, the area of said hump portion being less than the area of the remainder of the face and said rigid member having vent openings along the base of said hump portion, enclosing means at one side of the rigid member and cooperating therewith to form a closed chamber with which said vent openings communicate, and connections through which fluid pressure is regulated in said chamber whereby when a mat is positioned on said flat face and hump portion fluid pressure is applied against one side of the mat in a direction toward the face and hump portion and fluid is exhausted through said vent openings from the other side of the mat.

4. A device for making contoured floor coverings for humped automobile floors or the like, said device comprising a form having a top surface corresponding substantially to the floor area, said top surface being flat throughout the greater portion of its area and having a selected portion of its area of a humped form that is substantially a positive reproduction of a hump of the floor, and an electric heating element disposed on the under side of said form, for the purpose described.

5. An apparatus for making contoured floor coverings for humped automobile floors or the like, comprising a form having a top surface corresponding substantially to the floor area, said top surface being flat throughout the greater portion of its area and having a selected portion of its area of a humped form that is substantially a positive reproduction of a hump of the floor, means at one side of said form forming therewith a closed chamber, and means for regulating the air pressure in said chamber to create a differential air pressure on opposite sides of said form whereby the pressure over the floor surface of said form is greater than that opposite the under surface thereof for exerting pressure upon a deformable sheet laid over the upper surface of said form to cause the sheet to substantially conform to said hump, said form having perforations adjacent to the base of said hump for permitting the escape of air trapped by the said form and a sheet of deformable material placed thereover.

GEORGE W. BLAIR.
JOHN F. SCHOTT.